US012809931B2

(12) United States Patent
Burnett

(10) Patent No.: US 12,809,931 B2
(45) Date of Patent: Nov. 24, 2026

(54) INTERNET RESOURCE LOCATING SYSTEM

(71) Applicant: Jonathan Burnett, North Turramurra (AU)

(72) Inventor: Jonathan Burnett, North Turramurra (AU)

(*) Notice: Subject to any disclaimer, the term of this patent is extended or adjusted under 35 U.S.C. 154(b) by 0 days.

(21) Appl. No.: 19/164,549

(22) PCT Filed: Mar. 27, 2024

(86) PCT No.: PCT/AU2024/050279
§ 371 (c)(1),
(2) Date: Sep. 11, 2025

(87) PCT Pub. No.: WO2024/197343
PCT Pub. Date: Oct. 3, 2024

(65) Prior Publication Data

US 2026/0244699 A1 Aug. 20, 2026

(30) Foreign Application Priority Data

Mar. 28, 2023 (AU) ................................ 2023900861

(51) Int. Cl.
*G06F 16/00* (2019.01)
*G06F 16/28* (2019.01)
(Continued)

(52) U.S. Cl.
CPC ........ *G06F 16/9566* (2019.01); *G06F 16/288* (2019.01); *G06F 16/9538* (2019.01)

(58) Field of Classification Search
CPC . G06F 16/9566; G06F 16/288; G06F 16/9538
See application file for complete search history.

(56) References Cited

U.S. PATENT DOCUMENTS 6,957,224 B1 * 10/2005 Megiddo ............... G06F 16/955
707/999.102
2003/0105774 A1 * 6/2003 Oldham .............. G06F 16/9566
707/E17.115

(Continued)

FOREIGN PATENT DOCUMENTS

CN 105426474 A * 3/2016 ......... G06F 16/9566

OTHER PUBLICATIONS

Voss, J., "Encoding changing country codes for the Semantic Web with ISO 3166 and SKOS", arXiv preprint arXiv:0801.3908, published Jan. 25, 2008 https://arxiv.org/pdf/0801.3908 (10 pages).

*Primary Examiner* — Syed H Hasan
(74) *Attorney, Agent, or Firm* — INNOVATION CAPITAL LAW GROUP, LLP; Vic Lin

(57) ABSTRACT

The disclosed Internet resource locating system is designed to enhance navigation web resources. This system comprises a resource serving controller, which processes HTTP requests from computer devices to deliver corresponding resources, and a registry database that interfaces with the controller. The registry database contains lookup records, each featuring a unique short code and an expression that either directly identifies a URL (URL literal) or points to another lookup record. Additionally, the system includes an interface for the configuration of these lookup records. Upon receiving an HTTP request that includes a short code, the resource serving controller is configured to identify a lookup record with a matching or partially matching short code. It then either redirects the request to the URL specified by the lookup record's URL literal or presents a search result interface comprising further lookup records linked by any such link.

20 Claims, 13 Drawing Sheets

(51) Int. Cl.
*G06F 16/9538* (2019.01)
*G06F 16/955* (2019.01)

(56) References Cited

U.S. PATENT DOCUMENTS

| | | | | |
|---|---|---|---|---|
| 2011/0119302 | A1* | 5/2011 | Gorman | G06F 16/3335 707/E17.014 |
| 2011/0264992 | A1* | 10/2011 | Vishria | G06F 16/9566 715/208 |
| 2012/0173565 | A1* | 7/2012 | Jacobs | G06F 16/951 707/769 |
| 2013/0067115 | A1* | 3/2013 | Lapanc | H04L 61/106 709/245 |
| 2013/0179552 | A1* | 7/2013 | Bekker | H04L 63/0823 709/223 |
| 2015/0161282 | A1* | 6/2015 | Low | H04L 67/306 709/203 |
| 2018/0253505 | A1 | 9/2018 | Levy | |
| 2019/0132378 | A1* | 5/2019 | Perl | H04L 67/02 |
| 2020/0162423 | A1* | 5/2020 | Zhu | H04L 61/2596 |

* cited by examiner

102

101

| A | B | C | D |
|---|---|---|---|
| Seq | | | |
| 1 | Zero-Alcohol | | |
| 2 | | Zero-Alcohol-Beer | |
| 3 | | | ZA-Beer-Athletic-All-Out |
| 4 | | | ZA-Beer-Athletic-Free-Wave |
| 5 | | | ZA-Beer-Athletic-Round-of-Cheers |
| 6 | | | ZA-Beer-Athletic-Run-Wild |
| 7 | | | |
| 8 | | | ZA-Beer-Athletic-Sunset-Stoke |
| 9 | | | ZA-Beer-Athletic-Upside-Dawn |
| 10 | | | |
| 11 | | Zero-Alcohol-Spirits | |
| 12 | | Zero-Alcohol-Wine | |
| 13 | Products | | |
| 14 | | Athletic-Brewing | |
| 15 | | | Athletic-All-Out |
| 16 | | | Athletic-Free-Wave |
| 17 | | | Athletic-Round-of-Cheers |
| 18 | | | Athletic-Run-Wild |
| 19 | | | |
| 20 | | | Athletic-Sunset-Stoke |
| 21 | | | Athletic-Upside-Dawn |
| 22 | | | |
| 23 | Reviews | | |
| 24 | | Reviews-Zero-Alcohol-Products | |
| 25 | | | Reviews-Zero-Alcohol-Beer |
| 26 | | | |
| 27 | | | |

FIG. 5

102

| E | F |
|---|---|
| Codes | Resolved URL |
| | |
| | |
| | https://athleticbrewing.com/collections/beer/products/all-out |
| | https://athleticbrewing.com/collections/beer/products/free-wave |
| | https://athleticbrewing.com/collections/beer/products/brut-ipa |
| | https://athleticbrewing.com/collections/beer/products/run-wild |
| Athletic-Run-Wild-Review | https://athleticbrewing.com/collections/beer/products/run-wild |
| | https://athleticbrewing.com/collections/beer/products/sunset-stoke |
| | https://athleticbrewing.com/collections/beer/products/upside-dawn |
| Athletic-Upside-Dawn-Review | https://tipplezero.com/reviews/upside-dawn-golden-ale-review/ |
| | |
| | |
| | |
| | https://athleticbrewing.com |
| | https://athleticbrewing.com/collections/beer/products/all-out |
| | https://athleticbrewing.com/collections/beer/products/free-wave |
| | https://athleticbrewing.com/collections/beer/products/brut-ipa |
| | https://athleticbrewing.com/collections/beer/products/run-wild |
| Athletic-Run-Wild-Review | https://athleticbrewing.com/collections/beer/products/run-wild |
| | https://athleticbrewing.com/collections/beer/products/sunset-stoke |
| | https://athleticbrewing.com/collections/beer/products/upside-dawn |
| Athletic-Upside-Dawn-Review | https://tipplezero.com/reviews/upside-dawn-golden-ale-review/ |
| | |
| | |
| | |
| Review-Athletic-Run-Wild | https://athleticbrewing.com/collections/beer/products/run-wild |
| Review-Athletic-Upside-Dawn | https://tipplezero.com/reviews/upside-dawn-golden-ale-review/ |

FIG. 5
CONTINUED

101

| A | B (102) | C (103) | D (104) |
|---|---|---|---|
| **Seq** | **Code** | **Parent** | **Expression** |
| 1 | Zero-Alcohol | Zero-Alcohol | |
| 2 | Zero-Alcohol-Beer | Zero-Alcohol-Beer | |
| 3 | ZA-Beer-Athletic-All-Out | Zero-Alcohol-Beer | ~Athletic-All-Out |
| 4 | ZA-Beer-Athletic-Free-Wave | Zero-Alcohol-Beer | ~Athletic-Free-Wave |
| 5 | ZA-Beer-Athletic-Round-of-Cheers | Zero-Alcohol-Beer | ~Athletic-Round-of-Cheers |
| 6 | ZA-Beer-Athletic-Run-Wild | Zero-Alcohol-Beer | ~Athletic-Run-Wild |
| 7 | ZA-Beer-Athletic-Sunset-Stoke | Zero-Alcohol-Beer | ~Athletic-Sunset-Stoke |
| 8 | ZA-Beer-Athletic-Upside-Dawn | Zero-Alcohol-Beer | ~Athletic-Upside-Dawn |
| 9 | Zero-Alcohol-Spirits | Zero-Alcohol | |
| 10 | Zero-Alcohol-Wine | Zero-Alcohol | |
| 11 | Products | | |
| 12 | Athletic-Brewing | Products | https://athleticbrewing.com |
| 13 | Athletic-All-Out | Athletic-Brewing | https://athleticbrewing.com/collections/beer/products/all-out |
| 14 | Athletic-Free-Wave | Athletic-Brewing | https://athleticbrewing.com/collections/beer/products/free-wave |
| 15 | Athletic-Round-of-Cheers | Athletic-Brewing | https://athleticbrewing.com/collections/beer/products/brut-ipa |
| 16 | Athletic-Run-Wild | Athletic-Brewing | https://athleticbrewing.com/collections/beer/products/run-wild |

FIG. 6

101

| | | | |
|---|---|---|---|
| 17 | Athletic-Run-Wild-Review | Athletic-Run-Wild | ~Review-Athletic-Run-Wild |
| 18 | Athletic-Sunset-Stoke | Athletic-Brewing | https://athleticbrewing.com/collections/beer/products/sunset-stoke |
| 19 | Athletic-Upside-Dawn | Athletic-Brewing | https://athleticbrewing.com/collections/beer/products/upside-dawn |
| 20 | Athletic-Upside-Dawn-Review | Athletic-Upside-Dawn | ~Review-Athletic-Upside-Dawn |
| 21 | Reviews | | |
| 22 | Reviews-Zero-Alcohol-Products | Reviews | |
| 23 | Reviews-Zero-Alcohol-Beer | Reviews-Zero-Alcohol-Products | |
| 24 | Review-Athletic-Run-Wild | Reviews-Zero-Alcohol-Beer | https://athleticbrewing.com/collections/beer/products/run-wild |
| 25 | Review-Athletic-Upside-Dawn | Reviews-Zero-Alcohol-Beer | https://tipplezero.com/reviews/upside-dawn-golden-ale-review/ |

FIG. 6
CONTINUED

101

| A | B (102) | C (103) | D (104) | E (148) |
|---|---|---|---|---|
| **Seq** | **Code** | **Parent** | **Expression** | **Product_Handle** |
| 1 | Zero-Alcohol | | | |
| 2 | Zero-Alcohol-Beer | Zero-Alcohol | | |
| 3 | ZA-Beer-Athletic-All-Out | Zero-Alcohol-Beer | ~Athletic-All-Out | |
| 4 | ZA-Beer-Athletic-Free-Wave | Zero-Alcohol-Beer | ~Athletic-Free-Wave | |
| 5 | ZA-Beer-Athletic-Round-of-Cheers | Zero-Alcohol-Beer | ~Athletic-Round-of-Cheers | |
| 6 | ZA-Beer-Athletic-Run-Wild | Zero-Alcohol-Beer | ~Athletic-Run-Wild | |
| 7 | ZA-Beer-Athletic-Sunset-Stoke | Zero-Alcohol-Beer | ~Athletic-Sunset-Stoke | |
| 8 | ZA-Beer-Athletic-Upside-Dawn | Zero-Alcohol-Beer | ~Athletic-Upside-Dawn | |
| 9 | Zero-Alcohol-Spirits | Zero-Alcohol | | |
| 10 | Zero-Alcohol-Wine | Zero-Alcohol | | |
| 11 | Products | | | |
| 12 | Athletic-Brewing | Products | https://athleticbrewing.com | |
| 15 | Athletic-Brewing-Products | Athletic-Brewing | https://athleticbrewing.com/collections/beer/products/{Product_Handle} | |
| 16 | Athletic-All-Out | Athletic-Brewing-Products | " | all-out |
| 17 | Athletic-Free-Wave | Athletic-Brewing-Products | " | free-wave |
| 18 | Athletic-Round-of-Cheers | Athletic-Brewing-Products | " | brut-ipa |

FIG. 7

101

| | | | | |
|---|---|---|---|---|
| 19 | Athletic-Run-Wild | Athletic-Brewing-Products | " | run-wild |
| 17 | Athletic-Run-Wild-Review | Athletic-Run-Wild | ~Review-Athletic-Run-Wild | |
| 20 | Athletic-Sunset-Stoke | Athletic-Brewing-Products | " | sunset-stoke |
| 21 | Athletic-Upside-Dawn | Athletic-Brewing-Products | " | upside-dawn |
| 20 | Athletic-Upside-Dawn-Review | Athletic-Upside-Dawn | ~Review-Athletic-Upside-Dawn | |
| 21 | Reviews | | | |
| 22 | Reviews-Zero-Alcohol-Products | Reviews | | |
| 23 | Reviews-Zero-Alcohol-Beer | Reviews-Zero-Alcohol-Products | | |
| 24 | Review-Athletic-Run-Wild | Reviews-Zero-Alcohol-Beer | https://athleticbrewing.com/collections/beer/products/run-wild | |
| 25 | Review-Athletic-Upside-Dawn | Reviews-Zero-Alcohol-Beer | https://tipplezero.com/reviews/upside-dawn-golden-ale-review/ | |

FIG. 7
CONTINUED

101

| Seq | Code 102 | Parent 103 |
|---|---|---|
| 1 | Zero-Alcohol | Zero-Alcohol |
| 2 | Zero-Alcohol-Beer | Zero-Alcohol-Beer |
| 3 | ZA-Beer-Athletic-All-Out | Zero-Alcohol-Beer |
| 4 | ZA-Beer-Athletic-Free-Wave | Zero-Alcohol-Beer |
| 5 | ZA-Beer-Athletic-Round-of-Cheers | Zero-Alcohol-Beer |
| 6 | ZA-Beer-Athletic-Run-Wild | Zero-Alcohol-Beer |
| 7 | ZA-Beer-Athletic-Sunset-Stoke | Zero-Alcohol-Beer |
| 8 | ZA-Beer-Athletic-Upside-Drawn | Zero-Alcohol |
| 9 | Zero-Alcohol-Spirits | Zero-Alcohol |
| 10 | Zero-Alcohol-Wine | |
| 11 | Products | Products |
| 12 | Athletic-Brewing | Athletic-Brewing |
| 15 | Athletic-Brewing-Products | Athletic-Brewing-Products |
| 16 | Athletic-All-Out | Athletic-Brewing-Products |
| 17 | Athletic-Free-Wave | Athletic-Brewing-Products |
| 18 | Athletic-Round-of-Cheers | Athletic-Brewing-Products |
| 19 | Athletic-Run-Wild | Athletic-Brewing-Products |
| 17 | Athletic-Rut-Wild-Review | Athletic-Run-Wild |
| 20 | Athletic-Sunset-Stoke | Athletic-Brewing-Products |
| 21 | Athletic-Upside-Dawn | Athletic-Brewing-Products |
| 20 | Athletic-Upside-Dawn-Review | Athletic-Upside-Dawn |
| 21 | Reviews | |
| 22 | Reviews-Zero-Alcohol-Products | Reviews |
| 23 | Reviews-Zero-Alcohol-Beer | Reviews-Zero-Alcohol-Products |
| 24 | Review-Zero-Alcohol-Beer | Reviews-Zero-Alcohol-Beer |
| 25 | Review-Athletic-Upside-Dawn | Reviews-Zero-Alcohol-Beer |
| 26 | Layouts | |
| 27 | Layout-Product | Layouts |

FIG. 8

104

144

| Expression | Product_Handle | Product_Layout |
|---|---|---|
| | | |
| | | |
| ~Athletic-All-Out | | ~Layout-Product |
| ~Athletic-Free-Wave | | ~Layout-Product |
| ~Athletic-Round-of-Cheers | | ~Layout-Product |
| ~Athletic-Run-Wild | | ~Layout-Product |
| ~Athletic-Sunset-Stoke | | ~Layout-Product |
| ~Athletic-Upside-Dawn | | ~Layout-Product |
| | | |
| | | |
| | | |
| https://athleticbrewing.com | | |
| https://athleticbrewing.com/collections/beer/products/(Product_Handle) | | |
| " | all-out | |
| " | free-wave | |
| " | brut-ipa | |
| " | run-wild | |
| ~Review-Athletic-Run-Wild | | |
| " | sunset-stoke | |
| " | upside-dawn | |
| ~Review-Athletic-Upside-Dawn | | |
| | | |
| | | |
| | | |
| https://athleticbrewing.com/collections/beer/products/run-wild | | |
| https://tipplezero.com/reviews/upside-dawn-golden-ale-review/ | | |
| | | |
| https://wavetag/layouts/layout-product.txt | | |

FIG. 8
CONTINUED

144

146

| Product_Brand | Product_Name | Product_Style | Product_Image |
|---|---|---|---|
| | | | |
| | | | |
| Athletic | All Out | Extra Dark | athletic-all-out.png |
| Athletic | Free Wave | Hazy IPA | athletic-free-wave.png |
| Athletic | Round of Cheers | Brut IPA | athletic-round-of-cheers.png |
| Athletic | Run Wild | IPA | athletic-run-wild.png |
| Athletic | Sunset Stoke | Red IPA | athletic-sunset-stoke.png |
| Athletic | Upside Dawn | Golden Ale | athletic-upside-dawn.png |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |

148

FIG. 8
CONTINUED

INTERNET RESOURCE LOCATING SYSTEM

FIELD OF THE INVENTION

This invention relates generally to Internet resource locating systems, such as web directories, search engines and URL shortening services. More particularly, the present Internet resource locating system is configured to locate web resources using hierarchical and relational data to respond with HTTP redirects or structured search interfaces for enhanced Internet navigation.

BACKGROUND OF THE INVENTION

Search engines, URL shortening services, and web directories are pivotal Internet technologies that facilitate the organisation, discovery, and access to web resources through URL links. Search engines operate by crawling the World Wide Web to index web pages, images, and other content in a searchable database. They use algorithms to analyse the content and metadata of these pages, allowing users to retrieve relevant results based on search queries. This process involves sophisticated ranking mechanisms that consider factors such as keyword relevance, page quality, and user engagement to prioritise and present the most pertinent links.

URL shortening services, on the other hand, provide a more concise and user-friendly way to access web pages. They generate short, manageable URLs that redirect users to longer, often cumbersome web addresses. This is achieved through a mapping process where each short URL is uniquely linked to its corresponding long URL in a database. When a short URL is accessed, the service queries the database and redirects the user to the original web page. This not only improves the ease of sharing links but also helps in tracking user interactions and analytics.

Web directories categorise web resources into a hierarchical or thematic structure, allowing users to browse through categories and subcategories to find websites of interest. Unlike search engines, which automate the indexing of the web, web directories often rely on manual submission and curation of links. Each website within a directory is typically reviewed by human editors to ensure it fits the category and meets certain quality standards. This method provides a curated and often more reliable set of links for specific topics, although it lacks the comprehensiveness and immediacy of search engine results.

Together, these technologies play crucial roles in the architecture of the Internet, enabling efficient navigation, discovery, and utilisation of the vast amount of information available online.

It is to be understood that, if any prior art information is referred to herein, such reference does not constitute an admission that the information forms part of the common general knowledge in the art, in Australia or any other country.

SUMMARY OF THE DISCLOSURE

Despite their utility, URL shortening services lack mechanisms for grouping or classifying codes based on similarities, linking codes together, and accommodating dynamic URLs that can adjust parameters according to the context of a request, like a user's location or preferences. The process of translating a code to a URL typically happens automatically, without the possibility for user interaction, and there's no facility for broadening a search to include similar or related codes. Furthermore, the original, lengthy URL is often recorded in its entirety, complicating the verification process to ensure the link has been set up correctly. There's also no straightforward method to identify codes that point to different pages within the same website without directly comparing URL values. Lastly, any modifications to the original URL necessitate updates to all associated codes, adding to the administrative burden.

Web directories also face several significant challenges in their operation and effectiveness. Firstly, they rely on a pre-defined taxonomy for the classification of resources, which can limit flexibility and adaptability in categorising a diverse and evolving internet. The dependence on human curators for the manual classification of web resources introduces subjectivity and can result in inconsistencies in how resources are categorised. Moreover, web directories typically focus on classifying websites as a whole rather than the individual pages within those sites, potentially overlooking valuable content that could be relevant to users' searches. Additionally, the practice of restricting a website's classification to a single taxonomy diminishes the ability to accurately represent the multifaceted nature of many websites, which could belong to multiple categories. This approach can hinder users' ability to find specific content that spans across various subjects or themes.

Furthermore, several challenges mar the effectiveness of search engines. They tend to return an overwhelming volume of results, often including many that are irrelevant to the user's actual intent. This abundance can make navigating through the results cumbersome and time-consuming. Adjusting search queries to refine results is not always straightforward, complicating users' efforts to filter out undesired content. The ranking algorithms that dictate the order of search results are typically not transparent, leaving users and content creators alike puzzled about why certain pages rank higher than others. Additionally, the layout in which results are presented is largely fixed, offering little to no flexibility for resource owners to influence how their content is displayed. Moreover, search engines generally provide limited capabilities for previewing the content behind each link, requiring users to click through to the site to determine its relevance, further complicating the search process.

As such, there is provided herein an Internet resource locating system designed to serve web resources in response to HTTP requests to address the aforedescribed problems, or at least provide an alternative. Central to its operation is a resource serving controller, which interfaces with a registry database containing lookup records. These records are uniquely identified by a short code and may also include a hierarchical pointer to a parent record, alongside an expression. This expression can either directly identify a URL through a URL literal or point to another lookup record. To facilitate the dynamic management of these lookup records, the system incorporates an interface that allows for their configuration within the registry database.

Upon receiving an HTTP request that includes a specific short code, the resource serving controller executes a lookup to find a record that matches this code. Depending on the nature of the expression associated with the found lookup record, the controller then performs one of two actions. If the expression is a URL literal, the controller issues an HTTP redirect to the corresponding URL. Alternatively, if the expression links to another lookup record or if there's a partial match with the short code, the controller presents a search result interface. This interface comprises the linked lookup records or those related to the partial match, thereby facilitating user access to the desired web resources.

Unlike URL shortening services, which merely simplify long URLs into shorter links without providing additional context or navigation options, this system incorporates a hierarchical structure and relational links between resources, offering more nuanced navigation paths. Compared to web directories, which rely on static, human-curated classifications, the dynamic registry database allows for automated, flexible categorisation and the ability to classify resources in multiple, overlapping taxonomies. As compared to search engines, the present system provides a more structured and direct method to locate resources. Instead of relying on broad, keyword-based searches that often return an overwhelming number of irrelevant results, the present system uses precise matching and linking mechanisms within a controlled registry of resources. This approach reduces information overload and improves the relevance of retrieved content. Moreover, the system's capability to execute either HTTP redirects or present a structured search result interface, leveraging hierarchical and relational data models, enhances the mechanism of resource discovery.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 5 provides an example presentation of lookup records wherein link expressions are resolved with the results showing the target URLs in place of link expressions;

FIG. 6 shows examples of lookup records that demonstrate attaching a URL resource to another URL resource;

FIG. 7 shows exemplary rules demonstrating inclusion of a formula; and

FIG. 8 gives examples of lookup records 101 that include layouts for the display of lookup records.

DESCRIPTION OF EMBODIMENTS

There is provided herein an Internet resource locating system comprising a resource serving controller which is configured to serve resources responsive to HTTP requests received from computer devices via the Internet.

The system comprises a registry database operably interfacing the resource locator controller. The registry database comprises lookup records.

Figure 1:
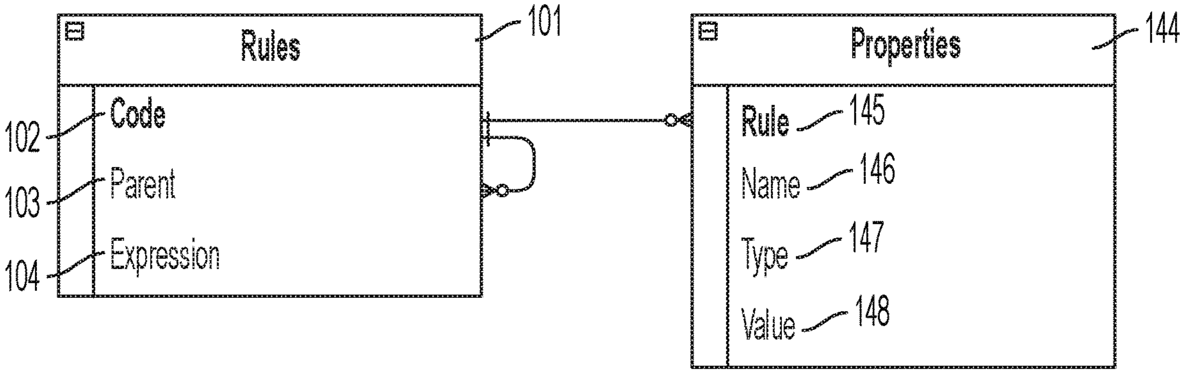
FIG. 1 shows an entity-relationship diagram of the underlying data structure of a lookup record required to support the classification and presentation of lookup records that link codes to URL resources.

FIG. 1 shows an exemplary data structure of a lookup record 101. The lookup record may comprise a unique short code 102 such as "Zero-Alcohol-Beer".

Furthermore, the lookup record comprises an expression 104. The expression 104 comprises either a URL literal identifying a URL or is a link identifying another lookup record.

The system further comprises an interface (such as a web interface or API) allowing resource owners to configuring lookup records in the registry database.

As such, the present system maintains the registry database of lookup records that link short codes with URLs.

In embodiments, the resource serving controller and registry database are implemented by a plurality of servers across the Internet, much like the operation of the domain name servers (DNS) system.

The resource serving controller may be implemented by a web server. The web server comprises a processor for processing digital data and comprises storage (such as a memory device and/or database storage) configured for storing digital data including computer program code instructions. In use, the web server fetches these computer program code instructions and associated data for implementing the functionality described herein.

The computer program code instructions may be logically divided into a plurality of computer program code instruction controllers. One such computer program code instruction controllers may be the resource serving controller.

Responsive to HTTP request comprising a short code 102, the resource serving controller is configured to identify matching lookup record 101 having a matching short code 102.

If the expression 104 of the matching lookup record comprises a URL literal, the resource serving controller is configured to respond with an HTTP redirect (such as a URL redirect with HTTP response status code 302).

Alternatively, if the expression 104 of the matching lookup record 101 comprises a link, the resource serving controller is configured to serve a search result interface displaying another lookup record 101 identified by any link of the matching lookup record.

The lookup record 101 may further comprise a hierarchical pointer 103 for a parent lookup record 102. As such, the resource serving controller may be further configured to identify child lookup records 101 according to associated hierarchical pointers and wherein the search result interface further displays the child lookup records 101.

Figure 2:
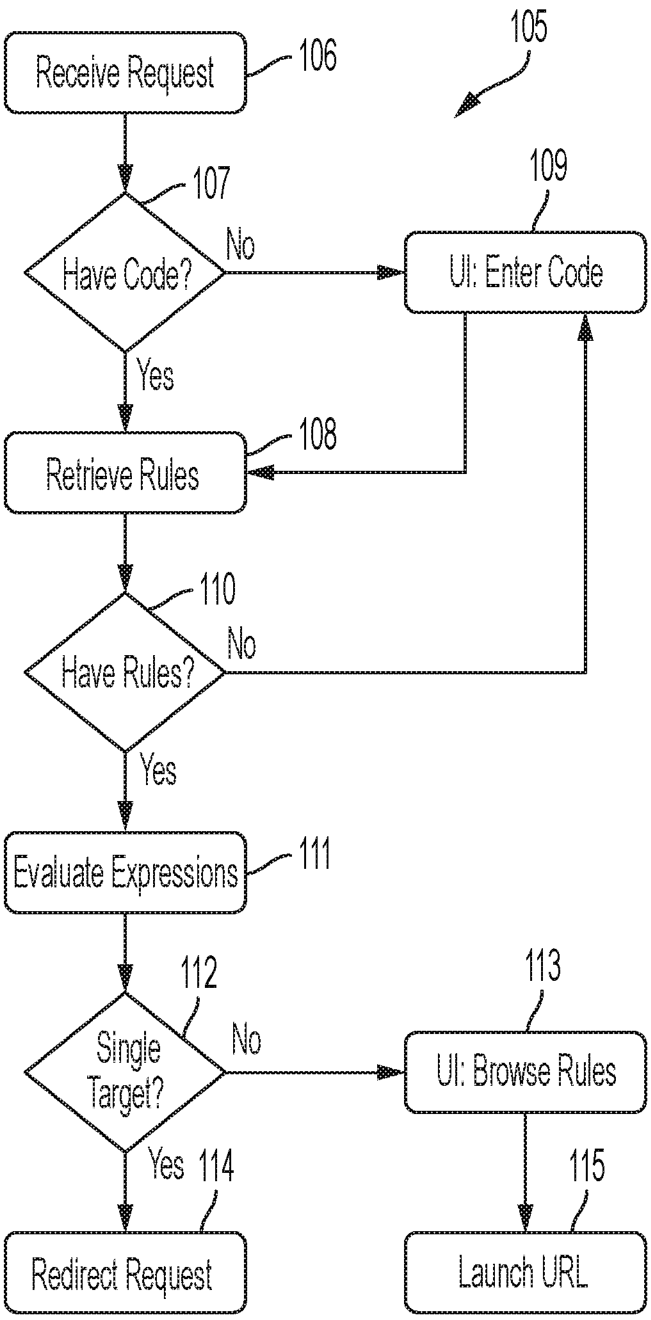
FIG. 2 shows exemplary processing by a resource serving controller of the present Internet resource locating system for processing HTTP requests.

FIG. 2 shows exemplary processing 105 by the resource serving controller for processing HTTP requests.

At step 106, the resource serving controller receives an HTTP request.

At decision 107, the controller determines if the request has a short code 102. The short code 102 may be encoded as a URL parameter provided with the request.

If not, the controller may present a user interface at step 109 to receive the short code 102, much like a web search engine interface.

Having obtained a short code 102, at step 108 the controller retrieves lookup record having matching codes 102.

If no lookup records 101 are found at step 110, the controller may again present the interface for receiving the short code 102 at step 109.

Alternatively, a lookup record 101 is found, the controller evaluates the expression 104 at step 111.

If the expression 104 is a single target expression wherein the expression comprises the URL literal identifying the URL, the controller responds with the HTTP redirect response at step 114.

Alternatively, if the expression 104 is not a single target expression wherein the expression comprises a link, at step 113 the controller is configured to serve a search result interface for browsing other lookup records identified by a link of the matching lookup record. A result within the browsing interface may be selected at step 115 to redirect to a URL.

Figure 3:
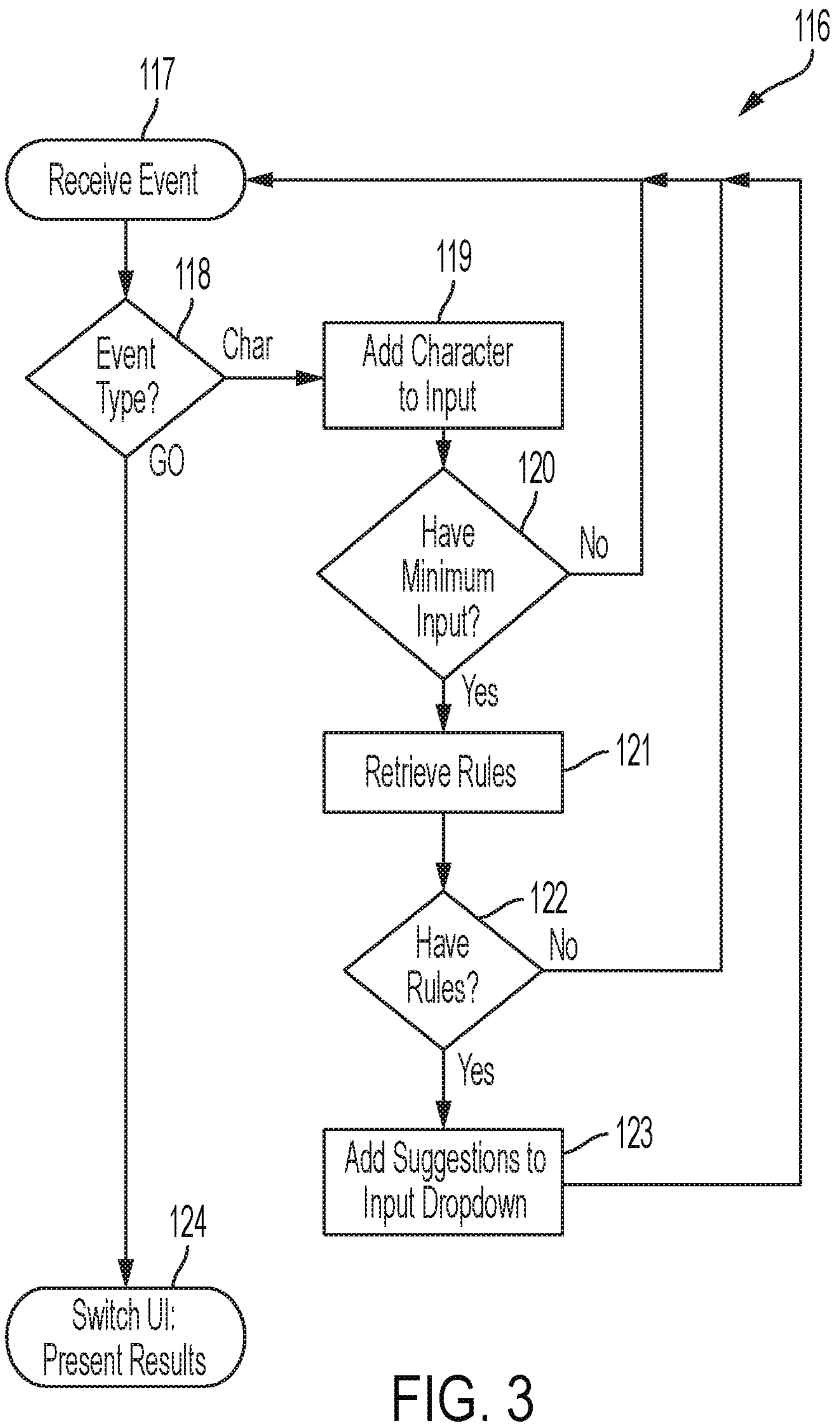
FIG. 3 shows exemplary processing by the controller to suggest short codes.

FIG. 3 shows exemplary processing 116 by the controller to suggest short codes 102 for the user interface displayed at step 109.

At step 117, an event is received. If the event is a character input event, the character is added to the user input until the user input is determined to have the minimum number of characters required at decision 120.

Once the user input meets the minimum number of characters, the system searches for matching lookup records 101 at step 121 and, if finding matching short codes 102 at decision 122, presents a drop-down of suggestions of the matching short codes 102 at step 123.

The user may select one of the matching short codes 102 from the drop-down menu wherein the system either redirects at step 114 or presents the user interface at step 115.

Figure 4:
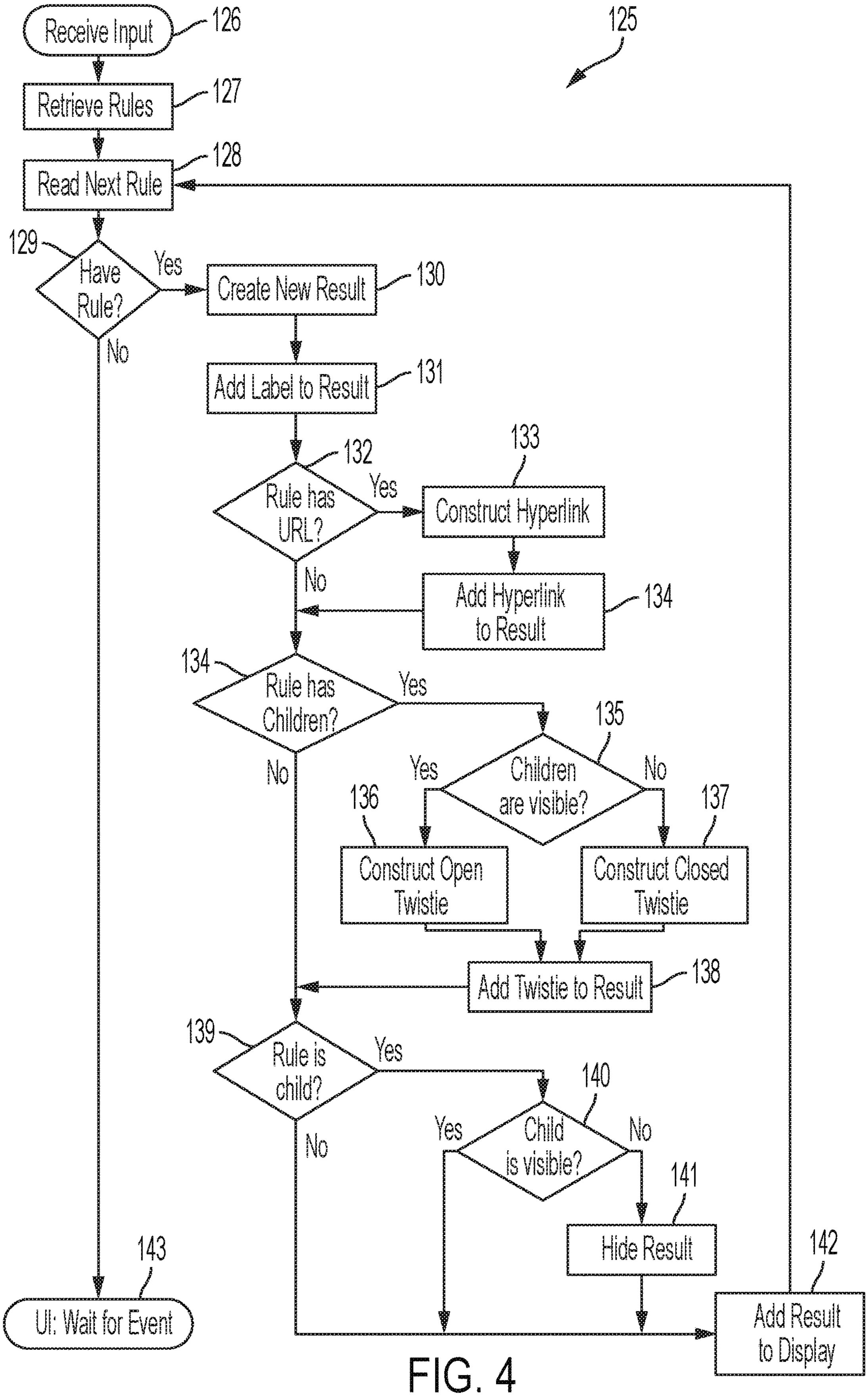
FIG. 4 shows exemplary processing wherein the resource serving controller serves the search result interface for browsing results of a search against the registry database.

FIG. 4 shows exemplary processing 125 wherein the resource serving controller serves the search result interface for browsing results of a search against the registry database and reflecting user interface behaviour required to present a set of lookup records that respond to a supplied short code 102.

The interface may be generated according to those lookup records 101 having a short code 102 that is a partial match to the provided search query.

The returned results displayed in the interface may be bulked-up to include any antecedent and descendant lookup records 101 defined by the relevant hierarchical pointers 103. In other words, the lookup record search results will generally be presented as a hierarchical set of lookup records 101.

The exemplary processing 125 reflects generation of the interface displaying matching lookup records 101 and creating hyperlinks to related URLs and wherein the matching lookup records 101 have hierarchical structure.

This means the results can be presented one level at a time, with a "twistie" control that enables lower levels to be shown or hidden.

At step 126, search term input is received and at step 127, the resource serving controller searches for matching lookup records 101 having codes 102 partially matching the search term input.

If matching records 101 are found at decision 129, the resource serving controller serves the user interface comprising results.

At step 130, a result is created for the user interface and, at step 131, a label is added to the result. The label may be generated using optional parameters of the lookup records 101.

If the lookup record 101 is found to have an associated URL (such as identified by the URL literal), a hyperlink is constructed at step 130 and added to the result at step 140.

If a record is found to have children lookup records 101 according to the hierarchical pointers 103 at decision 134 and the children lookup records are found to be visible at decision 135, hierarchical open and close controls are added at step 136 and 137 and added to the result at step 138.

If a lookup record 101 is determined to be a child at step 139 and is furthermore determined not be visible at decision 140, the associated result 141 is hidden.

At step 142, the resource serving controller as the result to the user interface.

As alluded to above, FIG. 1 shows an entity-relationship diagram of the underlying data structure of a lookup record 101 required to support the classification and presentation of lookup records 101 that link codes 102 to URL resources.

Each lookup record 101 includes fields for a short code which may be a string of characters that uniquely identifies a lookup record 101.

Each lookup record 101 may further comprises the hierarchical pointer 103 which may be an optional string of characters that identifies the code 102 of a parent lookup record 101.

Each lookup record 101 further comprises the expression 104 which may be a string of zero or more characters.

The expression 104 may be the URL literal which may be a string of characters that identifies a URL or and link which may be a string of characters that identifies another lookup record 101.

In embodiments, the expression 101 may further comprise a formula which may be a string that can be used in child lookup records 101 to derive a value for a URL.

Each lookup record 101 can also be linked to a set of properties 144.

Each property 144 may comprise a lookup record property 145 which may be a string of characters that identifies the short code 102 for the associated lookup record 101.

Each property 144 may comprise a name 146 which is used to differentiate between properties 144.

Each property 144 may comprise a value 148 which may be an expression that represents the data associated with the property 144.

Each property 144 may comprise a type 147 which is used to indicate how a related value 148 should be interpreted.

A formula may include literals, such as a string delimited by " " that requires no further interpretation.

A formula may further comprise placeholders, such as a string delimited by { } that is evaluated as a reference to a property.

A formula may further comprise functions, such as a string containing ( ) that is evaluated using a system function.

The data structure of the lookup record 101 allows the present system to classify URL resources using the hierarchical pointers 103.

Specifically, the hierarchical pointers 103 creates a hierarchical relationship between lookup records 101. There is no limit on the number of levels in the hierarchical relationship.

Lookup record hierarchies can create a link between two URL resources, even if there is no other connection between the resources in the form of embedded hyperlinks.

Furthermore, lookup record hierarchies can create classification taxonomies. For example, a specific URL can be represented in any number of taxonomies, using a URL literal or the link expression.

Furthermore, the short code 102 will usually include one or more alphanumeric tokens, separated by a character such as a dash, such as "Reviews-Zero-Alcohol-Beer" as an example.

A blank hierarchical pointer 103 would indicate that the associated lookup record is at the root of a classification taxonomy.

Furthermore, a blank expression 104 would indicate the lookup record represents a level in a classification taxonomy, but is not directly associated with a URL.

A tilde (~) prefix is recommended for link expressions to help differentiate them from URL literal expressions. Furthermore, a link expression may provide a shorthand method of classifying the same URL resource under multiple taxonomies.

Furthermore, a connection between a link expression 104 and a short code 102 may extend the hierarchical relationship between lookup records 101 because link expressions 104 enable nesting of taxonomies.

FIG. 6 shows examples of lookup records that demonstrate attaching a URL resource to another URL resource, such as wherein product URLs are attached to a supplier URL.

FIG. 6 further demonstrates attaching a link expression 104 to a URL, such as wherein a review link is attached to a product URL.

FIG. 6 further demonstrates attaching links expressions 104 to a classification taxonomy, such as "Zero-Alcohol".

FIG. 5 provides an example presentation of lookup records 101 wherein link expressions 104 are resolved with the results showing the target URLs in place of links expressions.

Furthermore, the link expressions 104 extend hierarchies, wherein, for example reviews are included in the "Zero-Alcohol" results.

Furthermore, the use of properties 144 allows for the presentation of URL resources.

Specifically, a property 144 can be used for placeholders in an expression 104 that is a formula that includes placeholders.

Furthermore, a property 144 can be used for properties used in the construction of an anchor tag for presenting a URL resource.

Furthermore, a property 144 can be used for metadata associated with a URL resource.

Furthermore, a property 144 can be used for layout information used in presenting a URL resource.

If a value for an expression 104 of a child lookup record is blank, the value thereof may be inherited from the closest antecedent lookup record. In embodiments, the use of a single double quote (") can be used to explicitly indicate that a value is inherited. Alternatively, a keyword or function such as Inherit( ) could also be used.

Furthermore, if the value for an expression 104 is a formula that includes placeholders, then the value for the placeholder may be held within a corresponding property.

The present system may support functions that evaluate to context and/or device related values, such as user location, time of day, device format or user preferences.

Furthermore, the present system may support functions such as 'IF' that enable formulas to include decision logic.

A property type 147 can be a base data type, such as Numeric, Text, Boolean or Date and can be used for populating placeholders or as additional metadata associated with a lookup record.

In embodiments, a property type 147 can also be a URI Attribute, such as email, mobile, landline or website field to be used in placeholders identified for constructing the href property of the corresponding Hyperlink associated with a lookup record.

In embodiments, the property type 147 can also be an Anchor property, such as the Label, Image, Target or Style to be used in constructing the Hyperlink associated with a lookup record 101.

In embodiments, the property type 147 can also be a layout attribute, such as a template for constructing an HTML element to display a lookup records.

In embodiments, the property type 147 can also be a resource attribute, such as URL, Filepath or lookup record 101 that identifies another resource associated with the lookup record 101.

A property value 148 can be any expression, including a Literal, Link, or Formula.

FIG. 7 shows exemplary lookup records 101 demonstrating inclusion of a formula, such as the expression of the lookup record 101 having the "Athletic-Brewing-Products" short code 102.

FIG. 7 further illustrates inheritance of an expression, such as the lookup records 101 under the lookup record 101 having the "Athletic-Brewing-Products" short code 102.

FIG. 7 further illustrates setting of properties 144 that are parameter values 148, such as those having the "Product_Handle" name 146.

FIG. 8 gives examples of lookup records 101 that include layouts for the display of lookup records 101, such as the "Product_Layout" property 144.

FIG. 8 also demonstrates that these layouts may be link expressions 104, such as the "Product_Layout" property 144.

FIG. 8 also demonstrates properties 144 that are Metadata that can be used in presenting results or properties 144 that are filenames, such as the "Product_Image" property 144.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. An Internet resource locating system comprising:

one or more web servers comprising one or more processors and memory storing computer program instructions; and a registry database accessible to the one or more processors, the registry database comprising lookup records, each lookup record comprising:

a short code comprising a plurality of alphanumeric tokens separated by a designated token delimiter;

a hierarchical pointer identifying a parent lookup record;

an expression; and a set of properties, each property comprising a name and a value;

wherein the expression comprises at least one of:

a URL literal identifying a URL;

a link expression identifying a target lookup record by a target short code; and a formula comprising a placeholder;

wherein the computer program instructions, when executed, cause the one or more processors to:

receive, from a computer device via the Internet, an HTTP request comprising a request short code;

retrieve, from the registry database, a matching lookup record having a short code that matches or partially matches the request short code;

evaluate the expression of the matching lookup record by at least one of:

resolving the URL literal to obtain a resolved URL;

retrieving the target lookup record identified by the link expression; and resolving the formula by substituting the value of a property of the matching lookup record for the placeholder;

when evaluation of the expression identifies a single resolved URL, respond to the HTTP request with an HTTP redirect configured according to the single resolved URL; and when evaluation of the expression does not identify a single resolved URL or when the short code of the matching lookup record partially matches the request short code, generate a search result interface comprising a hierarchical set of related lookup records determined from hierarchical pointers of the lookup records and including one or more hyperlinks constructed from resolved URLs associated with the related lookup records.

2. The system of claim 1, wherein the related lookup records comprise one or more child lookup records having respective hierarchical pointers identifying the matching lookup record as the parent lookup record.

3. The system of claim 1, wherein the related lookup records comprise one or more antecedent lookup records and one or more descendant lookup records defined by the hierarchical pointers.

4. The system of claim 1, wherein the search result interface presents the hierarchical set of related lookup records one level at a time.

5. The system of claim 4, wherein the search result interface comprises a user interface control configured to selectively show or hide lower levels of the hierarchical set of related lookup records.

6. The system of claim 1, wherein the link expression comprises a designated prefix character prepended to the target short code.

7. The system of claim 6, wherein the designated prefix character is a tilde.

8. The system of claim 1, wherein the designated token delimiter is a dash.

9. The system of claim 1, wherein the value of the property comprises at least one of a literal, a link expression and a formula.

10. The system of claim 1, wherein the formula comprises a placeholder delimited by braces.

11. The system of claim 1, wherein resolving the formula comprises substituting a property value from a child lookup record into the placeholder.

12. The system of claim 1, wherein resolving the formula comprises substituting a property value from an antecedent lookup record into the placeholder.

13. The system of claim 1, wherein a blank expression of a child lookup record causes the one or more processors to inherit an expression value from a closest antecedent lookup record.

14. The system of claim 1, wherein the formula comprises a system function.

15. The system of claim 14, wherein the system function evaluates at least one context-related or device-related value.

16. The system of claim 15, wherein the context-related or device-related value comprises at least one of user location, time of day, device format and user preference.

17. The system of claim 1, wherein at least one property of the set of properties comprises a property type indicating how the value of the property is to be interpreted.

18. The system of claim 17, wherein the property type comprises at least one of a URI attribute, an anchor property, a layout attribute and a resource attribute.

19. The system of claim 1, wherein the one or more hyperlinks are constructed using one or more properties selected from the set of properties.

20. The system of claim 1, wherein the search result interface displays at least one lookup record according to a layout identified by a layout property of the at least one lookup record.

* * * * *